Oct. 27, 1936.  A. J. HAZLE, JR  2,058,869
CLEAN-OUT MECHANISM FOR THE ENDS OF ROLLS
Filed Sept. 4, 1934  2 Sheets-Sheet 1
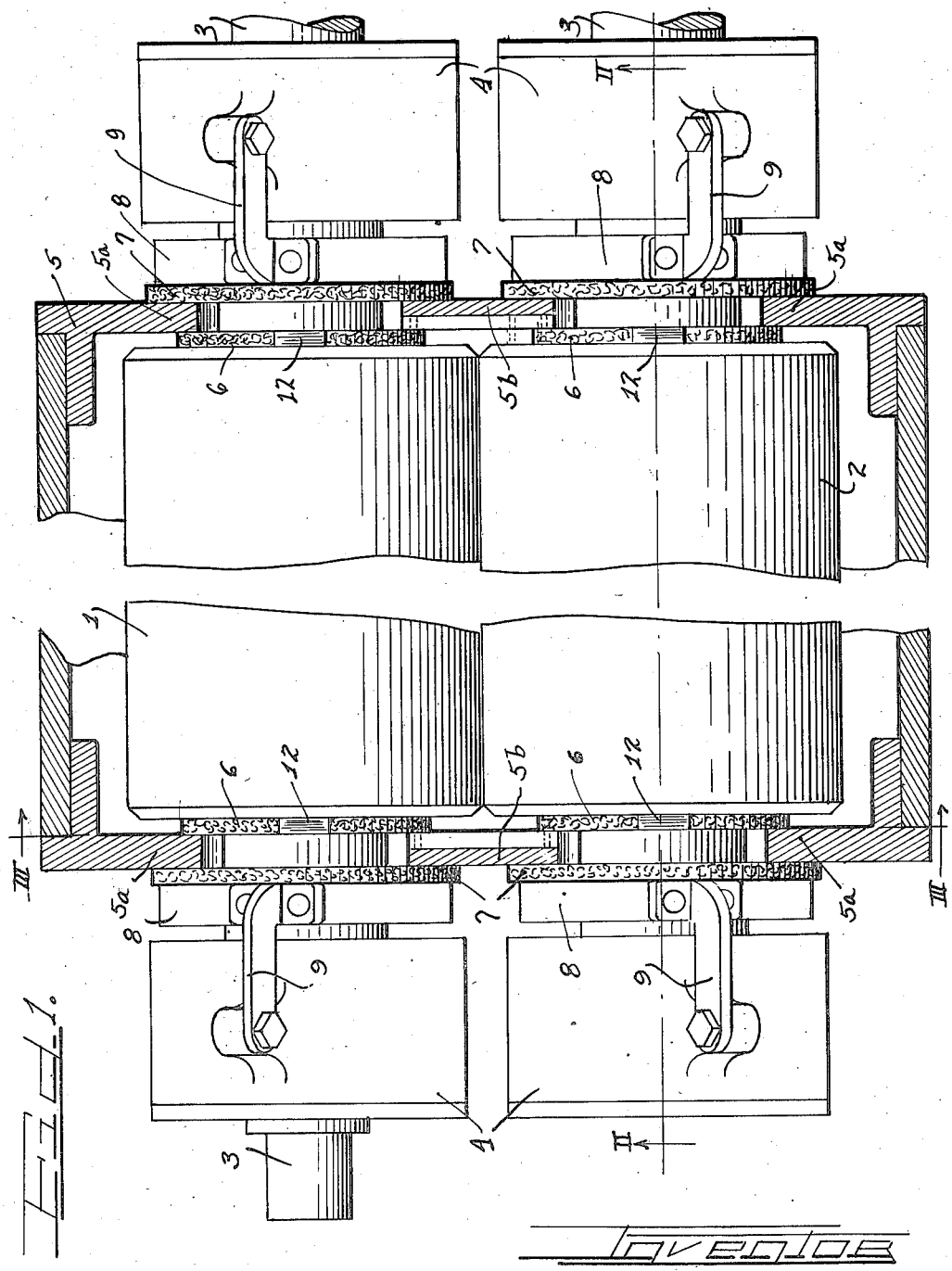

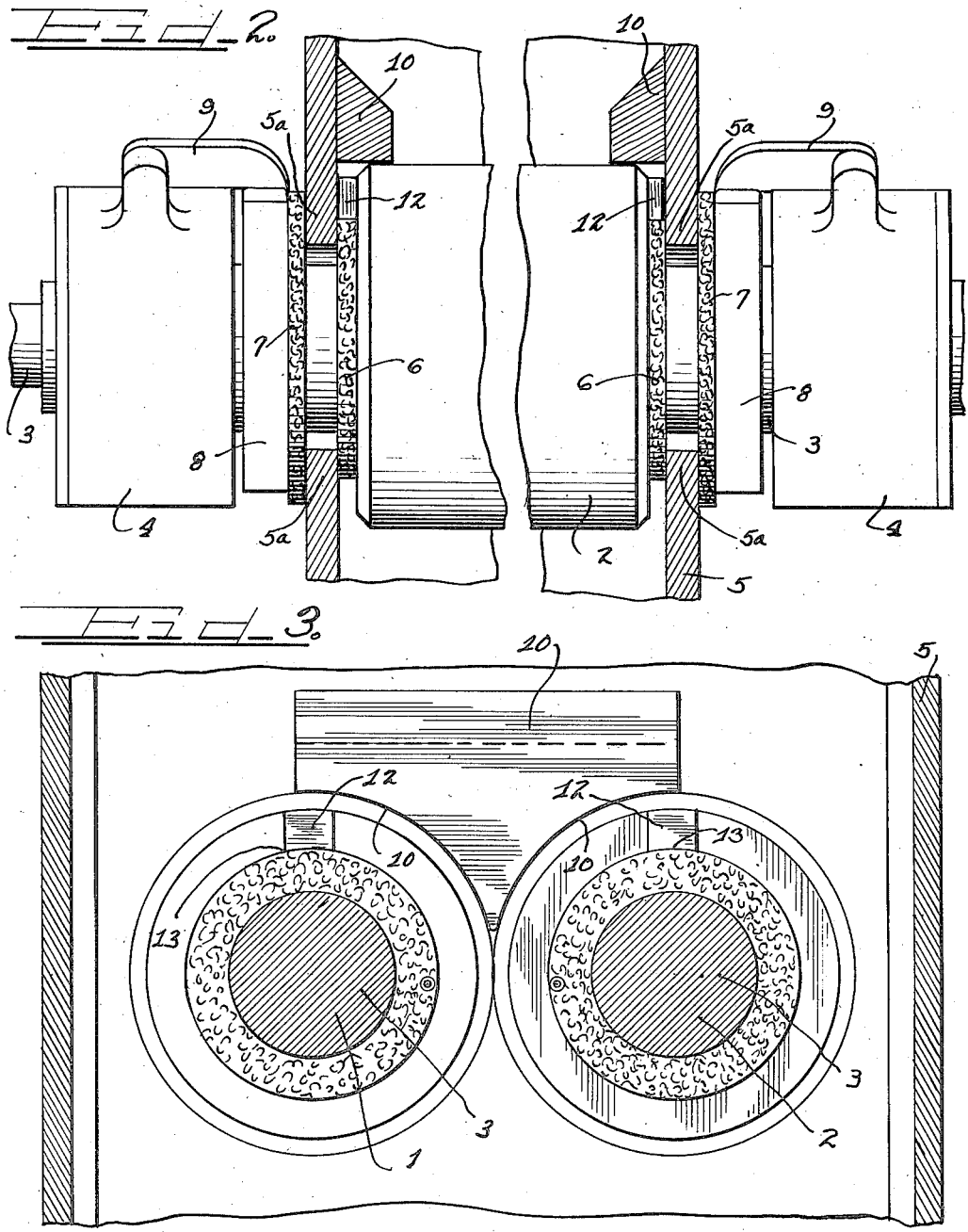

Patented Oct. 27, 1936

2,058,869

UNITED STATES PATENT OFFICE 2,058,869

CLEAN-OUT MECHANISM FOR THE ENDS OF ROLLS

Albert J. Hazle, Jr., Chicago, Ill., assignor to B. F. Gump Co., Chicago, Ill., a corporation of Illinois Application September 4, 1934, Serial No. 742,555

2 Claims. (Cl. 83—12)

This invention relates to clean-out mechanism for the ends of rolls. In mills involving grinding rolls for granulating coffee or cereals, a certain amount of the granulated products always seeps or finds its way to the spaces beyond the ends of the rolls where it cakes or clogs up and eventually raises the saddle upon the rolls and increases the leakage and sometimes distorts the bearings or causes a rupture of parts. Besides this leakage usually goes to waste.

This invention is designed to overcome this objection in the provision of means for constantly cleaning out the spaces beyond the ends of the rolls to prevent the granulated material from accumulating and caking up or distorting parts of the mill and returning such leakage to the mill.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a horizontal sectional view through a coffee mill involving this invention.

Figure 2 is a sectional view taken substantially upon the line II—II of Figure 1 with parts in elevation.

Figure 3 is a sectional view taken upon the line III—III of Figure 1 looking in the direction of the arrows.

In the drawings, there is shown a pair of grinding rolls 1 and 2 provided with end journals 3 which are journalled in suitable bearings 4, one roll and its bearings is relatively adjustable with respect to the other.

The rolls are encased in a housing 5, the side walls 5a of which extend between the ends of the rolls and the bearings 4. A felt washer 6 or the like is positioned against each end of each roll. These washers which surround the journals on the rolls also bear against the inner surfaces of the side walls 5a of the housing. The washers 6 are of smaller diameter than the rolls to provide a circular space between the peripheries thereof and the peripheries of the rolls. Felt washers 7 are also positioned upon the journals of the rolls between the outer surfaces of the side walls 5a and collars 8 loosely mounted upon said journals. The collars 8 are held against the washers 7 by holders 9. The housing also has a portion 5b extending between the rolls against one side of which the washers 8 also bear. The washers 6 bear against the inner side of the portion 5b of the housing.

Adjacent the inner surface of each side wall 5a there is a saddle 10 having lower concave surfaces 11 conforming to the peripheries of the roll under which leakage is adapted to occur. This leakage is partially forced through the use of spirally corrugated rolls.

Upon each end of each roll there is a clean-out lug 12. These lugs may be secured upon the rolls in any suitable manner, they are however preferably welded thereon. The lugs are preferably secured adjacent the peripheries of the rolls as shown in Figure 3 and engage the outer peripheries of the inner felt washers 6.

According to the illustrated structure just described, the ends of the rolls are spaced from the side walls 5a of the housing by the felt washers 6 and the lugs 12 upon the ends of the rolls have lower concave faces 13 conforming to the periphery of the washers 6. During the rotation of the rolls, these lugs will engage the peripheries of the washers 6. Consequently, the granulated coffee that creeps over the ends of the rolls will fall upon the washers 6 and will be carried therefrom by the lugs 12 until it falls to the bottom of the casing to be discharged with the granulated coffee that passes between the rolls.

It will accordingly be apparent that this invention not only serves to prevent the accumulation of leakage at the ends of the rolls in such a mill, it also serves to return the leakage while still fresh to the mill.

I am aware that many changes may be made and numerous details of construction may be varied through a wide range without departing from the principles of this invention, and I, therefore, do not propose limiting the patent granted hereon otherwise than necessitated by the prior art.

I claim as my invention:

1. In a cereal mill, a housing having side walls, a pair of grinding rolls mounted between said side walls and having the ends spaced from said walls, said rolls having journals extending through said side walls, saddles abutting said side walls and engaging the adjacent parts of the tops of said rolls and overlying the spaces between said walls and the ends of said rolls, washers of smaller diameter than said rolls positioned between said side walls and the ends of said rolls beneath said saddles, and lugs upon the ends of said rolls above said washers for sweeping leakage escaping from under said saddles into said housing.

2. In a cereal mill, a housing having side walls, a pair of grinding rolls mounted between said side walls and having their ends spaced from said walls, said rolls having journals extending through said walls, bearings beyond said walls in which said journals are mounted, stationary rings surrounding said journals between said bearings and wall, wall saddles engaging the tops of said rolls adjacent said side walls and overlying the spaces between the ends of the rolls and having concave surfaces conforming to the peripheries of the rolls, and lugs upon the ends of the rolls for sweeping leakage escaping under said saddles into said housing, said leakage normally falling into the spaces between the ends of the rolls and said walls and said stationary rings confining said leakage in the sphere of action of said lugs and preventing the same from entering said bearings.

ALBERT J. HAZLE, Jr.